(12) United States Patent
Guenther

(10) Patent No.: US 10,969,059 B2
(45) Date of Patent: Apr. 6, 2021

(54) LUBRICANT DISTRIBUTION SYSTEM AND METHOD FOR ITS OPERATION

(71) Applicant: SKF Lubrication Systems Germany GmbH, Walldorf (DE)

(72) Inventor: Armin Guenther, Helmstadt-Bargen (DE)

(73) Assignee: SKF LUBRICATION SYSTEMS GERMANY GMBH, Walldorf (DE)

( * ) Notice: Subject to any disclaimer, the term of this patent is extended or adjusted under 35 U.S.C. 154(b) by 568 days.

(21) Appl. No.: 15/862,063

(22) Filed: Jan. 4, 2018

(65) Prior Publication Data

US 2018/0202603 A1 Jul. 19, 2018

(30) Foreign Application Priority Data

Jan. 13, 2017 (DE) .......................... 102017200481.9

(51) Int. Cl.
*F16N 29/02* (2006.01)
*F16N 7/38* (2006.01)
*F16N 25/00* (2006.01)

(52) U.S. Cl.
CPC ............. *F16N 29/02* (2013.01); *F16N 7/385* (2013.01); *F16N 25/00* (2013.01)

(58) Field of Classification Search
CPC ........... F16N 29/02; F16N 7/385; F16N 25/00
See application file for complete search history.

(56) References Cited

U.S. PATENT DOCUMENTS

| 3,674,112 A * | 7/1972 | Roberts ................. F16C 17/243 184/6.1 |
| 7,367,428 B2 * | 5/2008 | Schmidt .................. F16N 7/385 184/6.1 |
| 2004/0040789 A1 * | 3/2004 | Rake ..................... F16N 39/005 184/6.23 |
| 2008/0202608 A1 * | 8/2008 | Tschida ............... F15B 13/0402 137/554 |
| 2009/0193965 A1 * | 8/2009 | Paluncic ................. F16N 25/02 92/61 |
| 2010/0161142 A1 * | 6/2010 | Guenther ............. G05B 19/106 700/283 |

(Continued)

FOREIGN PATENT DOCUMENTS

| CN | 101251225 A | 8/2008 |
| CN | 201284910 Y | 8/2009 |

(Continued)

OTHER PUBLICATIONS

Office Action and Search Report from the Chinese Patent Office dispatched Jul. 20, 2020 in related Chinese application No. CN201711070431.5, and translation thereof.

*Primary Examiner* — Michael A Riegelman
(74) *Attorney, Agent, or Firm* — T-Tek Law PLLC; Scott T. Wakeman; Mark A. Ussai

(57) ABSTRACT

A lubricant distribution system includes at least one lubricant pump, at least one metering device for distributing metered amounts of lubricant to consumption points, a sensor unit including at least one sensor element configured to detect at least one operating parameter of the metering device, and at least one programmable control unit configured to control the lubricant pump based on the detected operating parameter.

11 Claims, 5 Drawing Sheets

(56) References Cited

U.S. PATENT DOCUMENTS

| | | | |
|---|---|---|---|
| 2012/0037457 A1* | 2/2012 | Huang | F16H 57/0405 184/7.4 |
| 2012/0247876 A1* | 10/2012 | Kreutzkamper | F16N 29/02 184/26 |
| 2013/0008745 A1* | 1/2013 | Barrett | F16N 29/04 184/6.11 |
| 2013/0168187 A1* | 7/2013 | Conley | F16N 7/38 184/6 |
| 2015/0345701 A1 | 12/2015 | Conley | |
| 2016/0033079 A1* | 2/2016 | Guenther | F16N 7/38 184/7.4 |
| 2016/0208983 A1* | 7/2016 | Moilanen | F16N 19/00 |
| 2018/0202603 A1* | 7/2018 | Guenther | F16N 7/385 |
| 2018/0223984 A1* | 8/2018 | Dziuba | F01M 1/20 |
| 2018/0371945 A1* | 12/2018 | Chalaud | F16N 27/00 |
| 2018/0372006 A1* | 12/2018 | Chalaud | F02C 9/30 |
| 2019/0249826 A1* | 8/2019 | Buergy | F16N 13/04 |
| 2019/0263341 A1* | 8/2019 | Gustafson | F01M 1/16 |

FOREIGN PATENT DOCUMENTS

| | | |
|---|---|---|
| CN | 201795256 U | 4/2011 |
| CN | 202613006 U | 12/2012 |
| CN | 105135192 A | 12/2015 |
| CN | 105492818 A | 4/2016 |
| WO | 2015020644 A1 | 2/2015 |

\* cited by examiner

LUBRICANT DISTRIBUTION SYSTEM AND METHOD FOR ITS OPERATION

CROSS-REFERENCE

This application claims priority to German patent application no. 10 2017 200 481.9 filed on Jan. 13, 2017, the contents of which are fully incorporated herein by reference.

TECHNOLOGICAL FIELD

The disclosure relates to a lubricant distribution system and method for its operation.

BACKGROUND

Lubricant distributors as such are sufficiently known. The serve to dispense a lubricant to one or more lubrication points in a metered manner. They are often embodied in block construction and are designed for dispensing various metering volumes. At its two end sides each lubricant distributor can respectively include, for example, one or two threaded bores for the selective connecting of one or two main lines of a central lubrication system. The lubricant distributor may include, for example, eight threaded bores for connecting the lines to the lubrication points. The lubricant metering itself is effected by a metering piston that is movably disposed in a cylinder bore in the lubricant distributor housing. A defined amount of lubricant is dispensed with each stroke of the metering piston. A control piston is usually provided for controlling the metering piston. The control piston opens and closes the main lines. Depending on the pressure applied, the control piston moves in the one or the other direction, whereby as a result the metering piston also moves and dispenses a corresponding amount of lubricant.

In addition to single-line or two-line distributors the above description applies analogously also in the case of other distributors, for example, in the case of a progressive distributor in which a plurality of pistons correspondingly dispense lubricant to a plurality of lubrication points.

For proper operation it can be necessary to monitor the movement of the metering piston and/or of the control piston, i.e., to determine whether the metering piston performs its intended metering stroke or an intended number of metering strokes within an established time. For this purpose it is known to capture the movement of the metering piston and/or of the control piston using a sensor and to transmit the signal of the sensor to a control system integrated in the pump. The control system evaluates the signals and switches the pump on or off as needed. The sensor and pump accordingly contain components that are configured to cooperate.

SUMMARY

It is an aspect of the disclosure to specify a simplified lubricant distribution system and a method for its operation.

This aspect is achieved by a preferred embodiment of the disclosure. Accordingly a lubricant distribution system is specified, comprising at least one lubricant pump, at least one metering device for metered distribution of lubricant to consumption points, further comprising a sensor unit that has the following features:

At least one sensor element, using which at least one operating parameter of the metering device is capturable, At least one programmable control unit, using which the lubricant pump is controllable in a manner depending on the captured operating parameter.

Due to the integration of the control system into the control unit of the sensor element the lubricant pump can be embodied significantly more simply than in known systems. In the simplest case a switch element, e.g., a relay, is available in the pump that can interrupt the current supply. The switch element is switchable by the control unit such that the lubricant pump can be switched on and off in a simple manner. However, the complete control system and "intelligence" of the system lies in the control unit of the sensor unit, which is configured, for example, as a microchip. In numerous sensors used in lubricant distribution systems an electronic microchip for operation of the sensor, which microchip is also suited to carrying out the control logic in addition to the capturing of the operating parameter. Due to its simple design the pump is also universally usable in various types of lubrication systems.

In one preferred embodiment of the disclosure the metering device includes at least one metering piston in a metering channel, due to whose movement lubricant is dispensable in a metered manner to one of the consumption points, wherein the sensor element is configured such that a movement of the metering piston is capturable as an operating parameter. The detection of the movement of the piston ensures that the operation of the lubricant distribution system is reliably monitorable.

In one preferred embodiment of the disclosure the control unit includes a counting element by which a number of movements of the metering piston is storable and retrievable. The number of movements of the metering piston is relevant for the duration of a lubrication cycle. In general, a number of metering strokes are prescribed which are to be carried out in a fixed cycle time. Accordingly the number is to be monitored. The cycle time includes on the one hand the time required for carrying out the defined number of metering strokes and on the other hand a waiting time during which no lubricating shall or need take place. The waiting time is typically longer or significantly longer than the time wherein metering strokes are carried out. After expiration of the cycle time the lubrication is started anew.

In one preferred embodiment of the disclosure the control unit includes a time element by which at least two time durations are storable as cycle time and monitoring time and monitorable independently for their expiration. For monitoring the cycle time it is also advantageous to separately monitor the carrying out of the metering stroke. For this purpose a monitoring time is defined within which the number of metering strokes should take place. If the monitoring time elapses before the defined number of metering strokes is reached, there is a fault in the system. Therefore, it is advantageous when a fault signal is generatable by the time element after expiration of at least one of the time durations. The control unit and the lubrication pump are advantageously configured such that when the fault signal is generated the lubricant pump is switched off.

The disclosed aspect is also achieved by a method for operating a lubricant distribution system comprising the following method steps:

Monitoring the expiration of a definable cycle time,
After expiration of the cycle time:
Starting the lubricant pump,
Starting the monitoring of the expiration of a monitoring time, Starting the monitoring of the reaching of a threshold value of an operating parameter of the metering unit and Renewed starting of the monitoring of the cycle time, Upon reaching the threshold value before expiration of the monitoring time:

Switching-off the lubricant pump, or

Upon expiration of the monitoring time before reaching the threshold value:

Switching off the lubricant pump and

Emitting a fault signal.

Here an easy-to-implement method results by which the secure operation of the system is reliably monitorable. Fault situations can be reacted to quickly.

In one preferred embodiment of the method a definable number of movements of the metering piston is used as threshold value of the operating parameter.

In one advantageous embodiment of the disclosure a valve unit is disposed between the pump and the metering device, which valve unit includes at least two switching states. In a first switching state lubricant pumped by the lubricant pump is directed via a line into a reservoir. In a second switching state lubricant pumped by the lubricant pump is pumped via a line to the metering unit. The valve unit is preferably connected to the control unit and switchable thereby between the switching states. As soon as the pump is switched on by the control unit the valve unit is also switched into the second switching state so that the lubricant reaches the metering unit. A preferred lubrication system can comprise a plurality of mutually independent metering units, each of which having a sensor unit and a valve unit associated therewith. Thus a multi-circuit system can be constructed in a simple manner, wherein independent lubrication circuits can be supplied by a lubricant pump and profit from the disclosed advantages.

In another embodiment, a lubricant distribution system includes a lubricant pump and a metering device for distributing metered amounts of lubricant to consumption points. The metering device includes a metering piston configured to move linearly from a first position to a second position, a programmable control unit, and a sensor configured to detect when the metering piston is at the first position and to send a signal to the programmable control unit in response to the metering piston being at the first position. The programmable control unit is configured to store a first duration as a cycle time and to store a second duration as a monitoring time and to store a cycle number, and to measure a first time and to independently measure a second time and to count a number of signals received from the sensor and to control the lubricant pump based on the number of signals. The signals may represent, for example, a detection of the presence of a metering piston at a give location.

Further advantages, features, and details of the disclosure arise from the exemplary embodiments of the disclosure described below with reference to the Figures.

DETAILED DESCRIPTION

Figure 1:
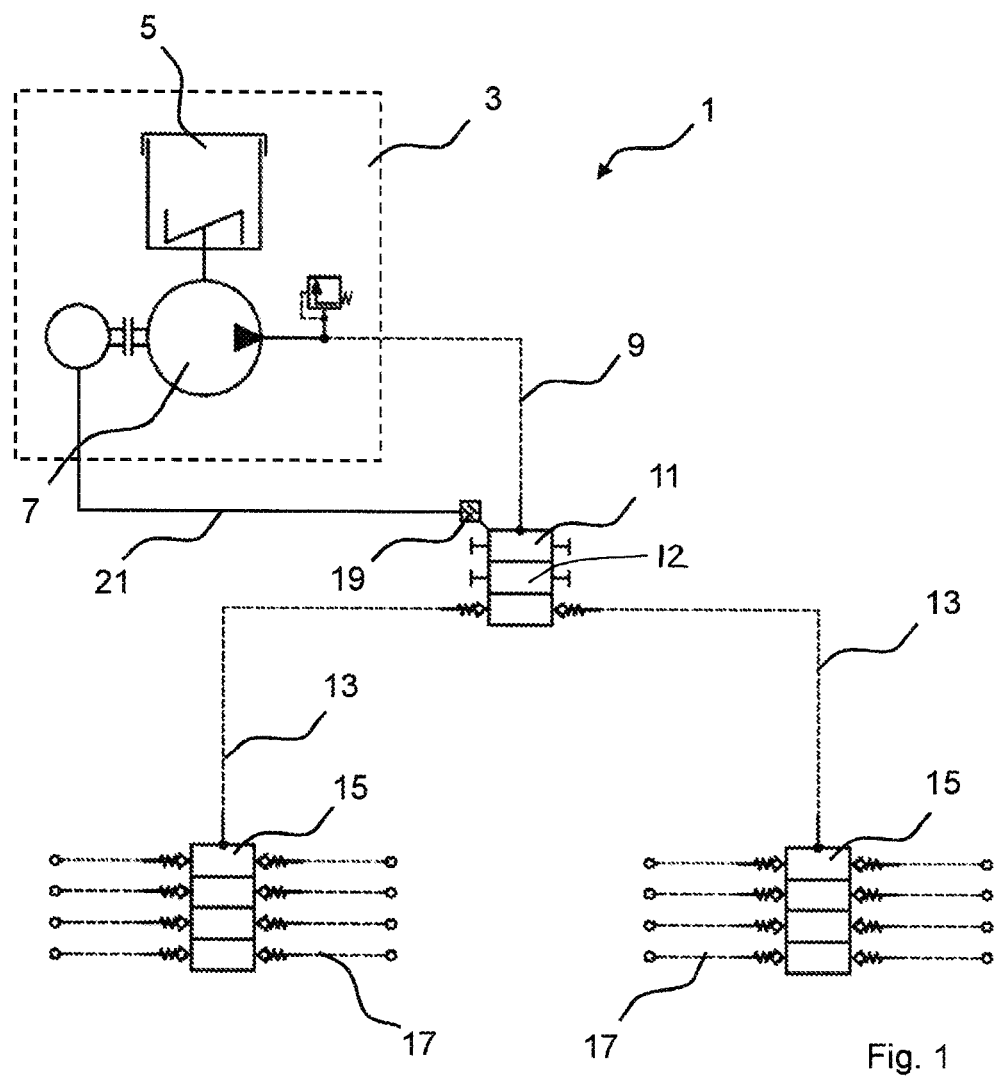
FIG. 1 is a schematic view of a lubricant distribution system according to an embodiment of the disclosure.

FIG. 1 shows a progressive distribution system according to a preferred embodiment of the disclosure. It comprises a pump unit 3, which includes a lubricant reservoir 5 and a pump 7. A line 9 for lubricant connects the pump 7 to a distributor block 11, which is in turn connected via multiple lines 13 to lubrication points (not depicted here) or further distributor blocks 15. The latter are in turn connected via lines 17 to lubrication points. This construction is known per se and needs no detailed explanation. On the distributor block 11 a sensor 19 is mounted that can capture the movement of a metering piston 12 movably disposed in the distributor block 11. The sensor 19 is connected via a control line 21 to the pump 7 and is able to switch the pump 7 on and off, which is explained in detail based on the following Figures.

Figure 2:
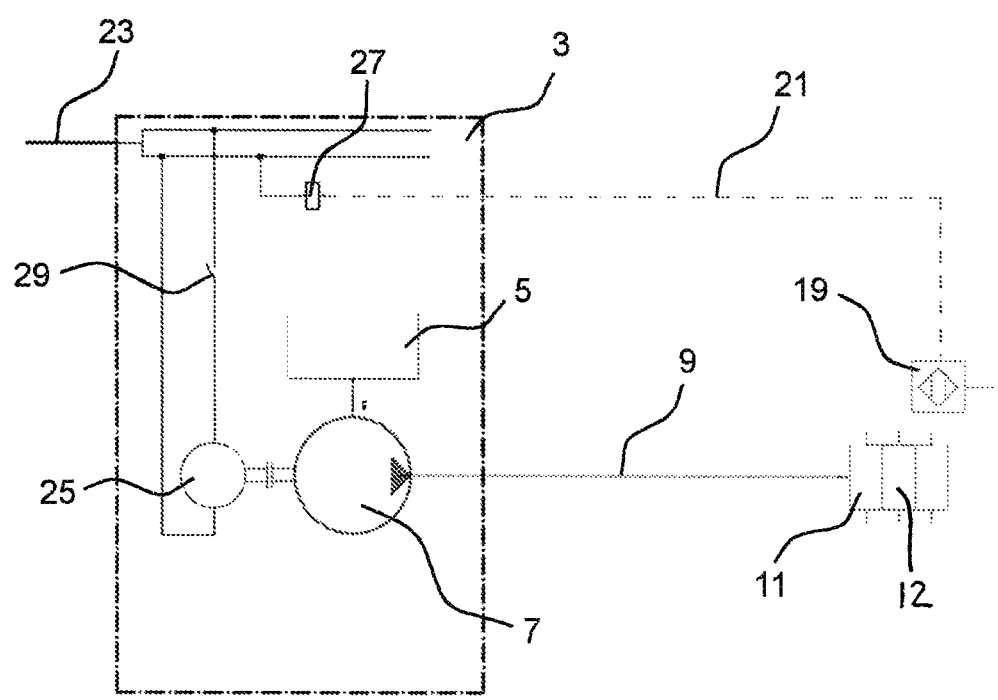
FIG. 2 schematically shows a lubricant pump connected to a sensor.

In FIG. 2 the interaction of the sensor 19 with the pump unit 3 is schematically depicted. The sensor 19 and the distributor block 11 are depicted here only as functional elements and therefore not joined together. The pump unit 3 is supplied with current via a cable 23. Here, for example, there can be a voltage of 24 volts. The voltage is fed into a motor 25 that thereby drives the pump 7. Then lubricant is removed from the reservoir 5 and pumped via the line 5 to the distributor block 11 and from this to the lubrication points or further distributor blocks. The sensor 19 is connected via the line 21 to a relay 27 of the pump unit 3, by which a switch 29 can be switched. Opening the switch 29 switches the motor 25 is off so that no more lubricant is pumped by the pump 9. The electronics in the pump unit 3 are consequently embodied particularly simply and thus cost effective and are not very susceptible to faults. In addition, due to its simple design, the pump unit 3 is usable for various types of lubrication systems, since it contains no specific functional element.

Figure 3:
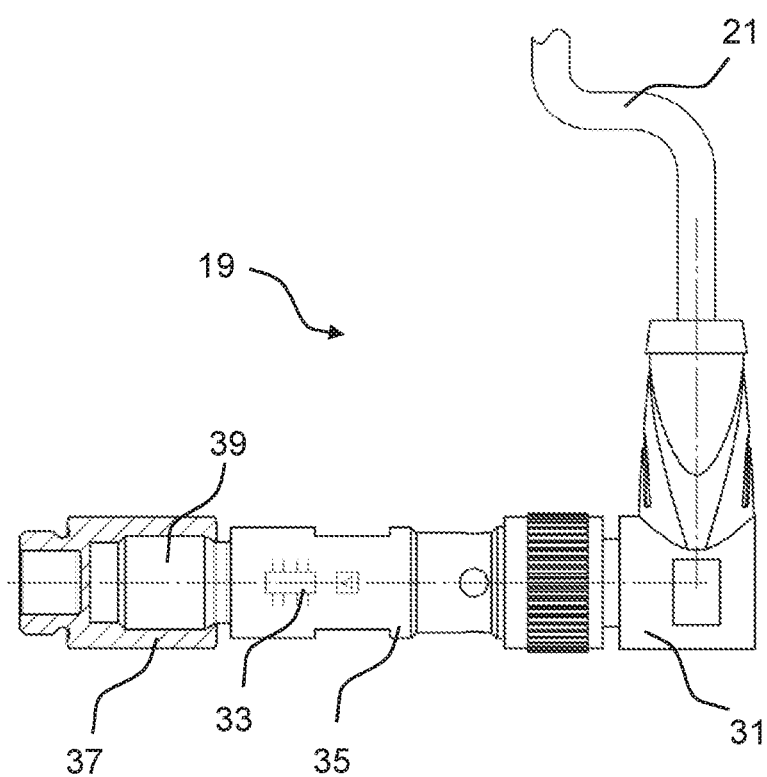
FIG. 3 schematically shows a sensor according to an embodiment of the disclosure.

In FIG. 3 the sensor 19 is depicted in more detail. It comprises a connector 31, via which the cable 21 is connected to an electronic microchip 33. The sensor 19 further comprises a housing 35 that is connected to the distributor block via an adapter 37. A detector 39 here captures the movement of a metering piston not depicted here. For example, an end of the metering piston may project from the distributor block 11 into the housing 35 at one end of its metering stroke so that the detector 39 can detect, e.g., electrically, optically or by physically contact, the presence of the piston in the housing 35. Both the programming for the operation of the detector 39 and the control program for the pump unit 3 are stored in the microchip 33. It typically comprises diverse components for the carrying out of computer programs, e.g., a processor and storage elements.

Figure 4:
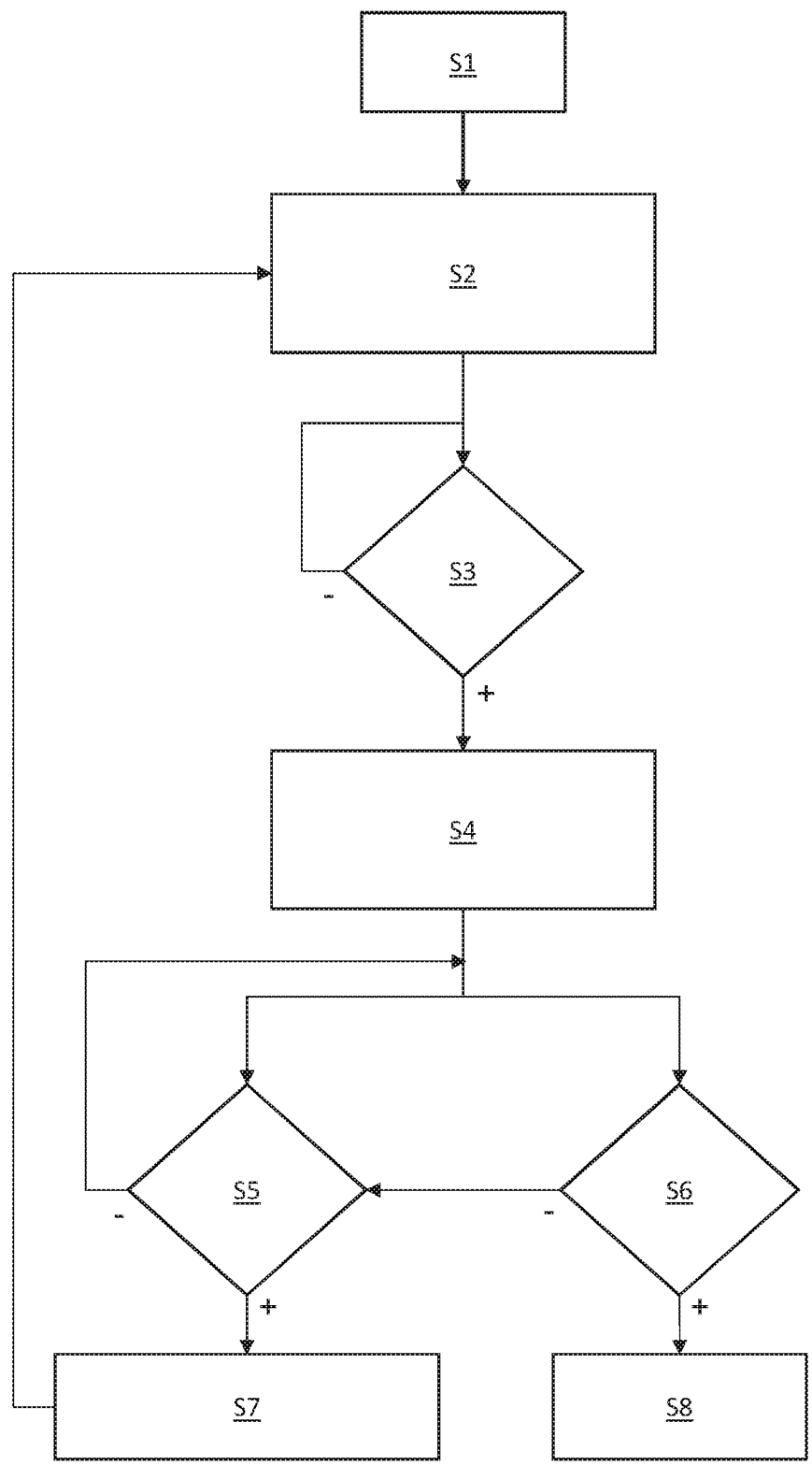
FIG. 4 is a flow diagram according to an embodiment of the disclosure.

A schematic flow diagram is depicted in FIG. 4 for a control method according to a preferred embodiment of the disclosure.

Using PC software or an app in connection with a correspondingly configured user interface the user can adjust the relevant control parameters including cycle time, monitoring time, and number of piston strokes. The parameters are stored in a non-volatile memory, e.g., an EEPROM in microchip 33 of the sensor 19. The cycle time is selected and adapted to the individual application such that a lubrication process should take place within the cycle time. The lubrication process comprises a number of piston strokes. A defined amount of lubricant is thereby distributed in a metered manner. After execution of the piston strokes the lubrication process is completed per se and the expiration of the cycle time is awaited. The remaining cycle time is typically significantly longer than the duration of the piston strokes, i.e., the actual lubrication process. The thus ongoing waiting time that is a component of the cycle time is correspondingly long. The monitoring time serves for monitoring the actual lubrication process, i.e., the carrying out of the piston strokes. It is therefore selected longer than the piston strokes last in the longest case so that no false fault signals are emitted. However, it is still typically significantly shorter than the cycle time. The cycle time is regularly stored in a working memory (RAM) of the microchip 33. Upon switching the voltage supply off, e.g., for maintenance purposes, the remaining cycle time is stored in the EEPROM of the microchip 33 so that after the voltage supply is switched back on the cycle time is not started anew but rather can continue. This avoids the lubrication points going without lubrication for too long a time.

If the sensor 19 is supplied with voltage that is switched on in a first method step S1, then the previously selected cycle time adapted to the individual system begins to run in a method step S2. Depending on the operating state prior to the switching-off an already partially completed cycle time can also be continued. In a method step S3 the cycle time is monitored for its expiration. After the expiration of the cycle time in a method step S4 the lubricant pump is switched on and the lubrication process started. The lubricant pump now pumps lubricant to the distributor block 11. Simultaneously the monitoring time is started and the cycle time started anew.

The sensor 19 now registers and counts the pumping strokes of the piston. In a method step S5 the stroke number counted is compared to the set value. Simultaneously in a method step S6 the expiration of the monitoring time is monitored. If the defined stroke number is reached, in a method step S7 the pump is switched off and the monitoring time reset, whose monitoring is consequently terminated. The lubrication process is completed and the running of the remaining cycle time is continued in method step S2.

If there is an expiration of the monitoring time in method step S6 before the defined number of piston strokes is reached, there is a fault in the system. Consequently the lubricant pump is switched off in a method step S8 and a fault signal is generated.

The sensor 19 can preferably also contain an IO-link functionality for connecting sensors to automation systems. The sensor 19 is then configured such that when an IO-link master is recognized on the control side, the parameterization and communication of the device can also be controlled directly via IO-link. Accordingly the sensor 19 includes appropriate connections and control elements. This means that the user then can also evaluate and reparameterize the sensor via an available IO-link structure and fieldbus system in running operation, which facilitates the integration in existing infrastructures.

Figure 5:
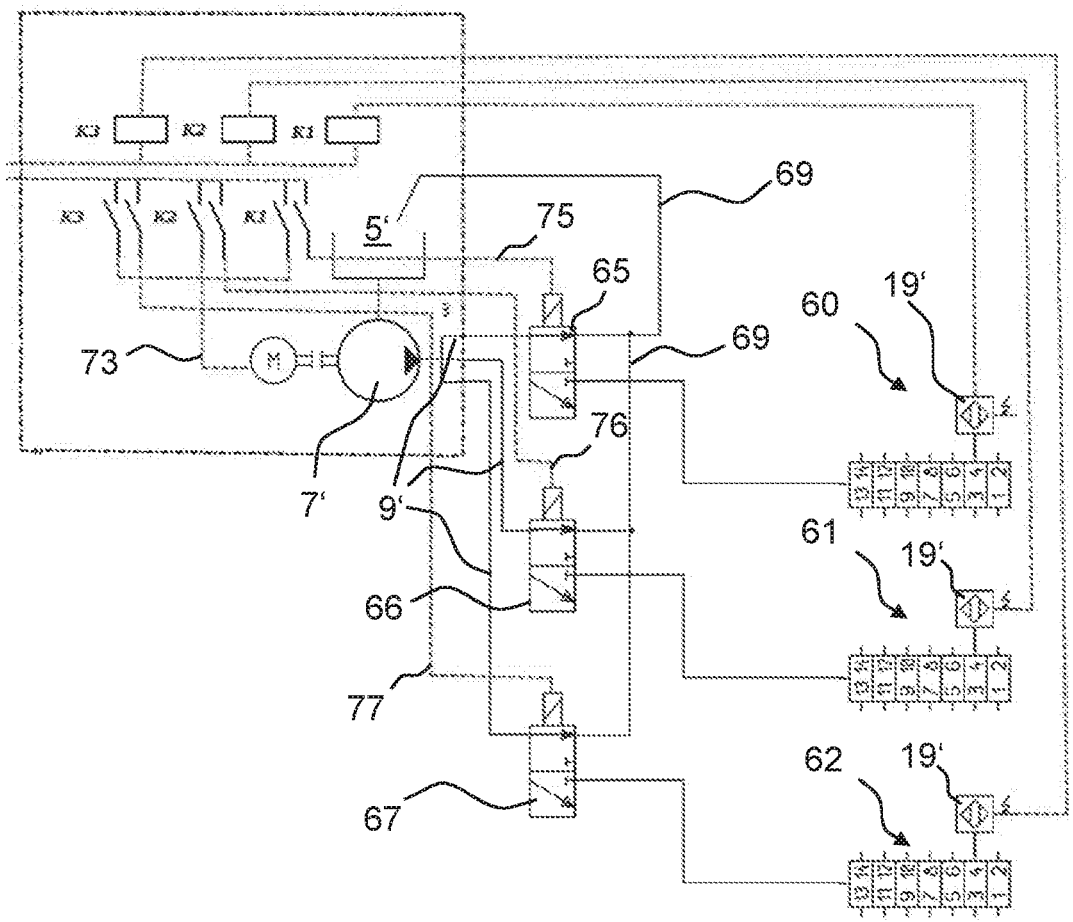
FIG. 5 is a schematic illustration of a multi-circuit lubricant distribution system according to an embodiment of the disclosure.

On the basis of the disclosure it is also possible to construct multi-circuit lubrication systems including a pump in connection with 3/2-way valves, which is schematically depicted in FIG. 5. Such a system comprises three lubrication circuits 60, 61, and 62, each including a sensor 19' with the parameters (cycle time, monitoring time, and number of piston strokes) required for the associated lubrication circuit 60, 61, or 62. The parameters are stored as already described in an EEPROM in the respective sensor 19'. Each lubrication circuit 60, 61, and 62 is also associated with a 3/2-way valve 65, 66, or 67 that in the currentless state pumps back lubricant, pumped by the pump 7' via lines 9', via a return line 69 into the reservoir 5'. As soon as the cycle time of one of the lubrication circuits has expired the associated 3/2-way valve 65, 66, or 67 is switched via correspondingly provided switch units K1, K2, and K3 and the pump 7' is switched on. For this purpose the pump 7' is connected to each of the switch units K1, K2, and K3 via a cable 73. In addition the 3/2-way valve 65 is connected to the switch unit K1 via a cable 75. Accordingly the 3/2-way valve 66 is connected to the switch unit K2 and the 3/2-way valve 67 to the switch unit K3 via cables 76 and 77.

After it is switched on, the pump 7' pumps lubricant from the reservoir 5' to the 3/2-way valves 65, 66, and 67, wherein only the 3/2-way valves 65, 66, and 67 that are switched (i.e., not currentless) allow lubricant through to the corresponding lubricant circuit 60, 61, or 62. The further currentless 3/2-way valves 65, 66, or 67 guide the lubricant back, since no lubrication process is to take place in the corresponding lubrication circuit 60, 61, or 62. The pump 7' can include a number of pump elements, corresponding to the number of lubrication circuits 60, 61, or 62, that pump the lubricant into the corresponding lines 9' to the 3/2-way valves 65, 66, or 67 as soon as the pump 7' is switched on. The pump 7' pumps as soon as at least one of the sensors 19' emits a corresponding signal. It is also possible that a plurality of sensors 19' emit the signal simultaneously or with a slight temporal offset and switch on the pump. In this respect a multi-circuit system can be constructed in a simple manner that uses the advantages of the disclosure.

Alternatively the lubricant distribution system can be embodied as a single-line or two-line system. The control unit can be contained in various and also multiple sensors. These can be, for example, pressure switches or pressure sensors, as well as also a leak detection sensor.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved lubricant distribution systems.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

| REFERENCE NUMBER LIST | |
|---|---|
| 1 | Progressive distribution system |
| 3 | Pump unit |
| 5, 5' | Lubricant reservoir |
| 7, 7' | Pump |
| 9, 13, 17 | Line |
| 11, 15 | Distributor block |
| 19, 19' | Sensor |
| 21 | Control line |
| 23, 73, 75, 76, 77 | Cable |
| 25 | Motor |
| 27 | Relay |
| 29 | Switch |
| 31 | Connector |
| 33 | Microchip |
| 35 | Housing |
| 37 | Adapter |
| 39 | Detector |
| 60, 61, 62 | Lubrication circuit |
| 65, 66, 67 | 3/2-way valve |
| 69 | Return line |
| S1-S8 | Method step |

What is claimed is:

1. A lubricant distribution system comprising:
at least one lubricant pump,
at least one metering device for distributing metered amounts of lubricant to consumption points,
a sensor unit including at least one sensor element configured to detect at least one operating parameter of the metering device and to generate signals based on the operating parameter, and
at least one programmable control unit configured to receive the signals from the sensor unit and to control the lubricant pump based on the number of signals received from the sensor unit.

2. The lubricant distribution system according to claim 1, wherein the metering device includes at least one metering piston in a metering channel, the metering piston being configured to dispense the lubricant in a metered manner to the consumption points by moving along the metering channel,
wherein the sensor element is configured to detect a movement of the metering piston, and
wherein the movement of the metering piston is the operating parameter.

3. The lubricant distribution system according to claim 2, wherein the control unit includes a microchip having a counter configured to count a number of the movements of the metering piston and a memory configured to store the number.

4. The lubricant distribution system according to claim 1, wherein the metering device includes at least one metering piston in a metering channel, the metering piston being configured to dispense the lubricant in a metered manner to the consumption points by moving along the metering channel,
wherein the sensor element is configured to detect a position of the metering piston, and
wherein the position of the metering piston is the operating parameter.

5. The lubricant distribution system according to claim 1, wherein the control unit includes a microchip having a memory storing a cycle time and a monitoring time, and
wherein the microchip of the control unit includes a timer configured to measure a first duration and to measure a second duration, and
wherein the control unit is configured to determine if the first duration exceeds the cycle time and to determine, independently, if the second duration exceeds the monitoring time.

6. The lubricant distribution system according to claim 5, wherein the control unit is configured to generate a fault signal if the first duration exceeds the cycle time and/or if the second duration exceeds the monitoring time.

7. The lubricant distribution system according to claim 6, wherein the control unit is configured to switch off the lubricant pump in response to the generation of the fault signal.

8. The lubricant distribution system according to claim 1, wherein the metering device includes at least one metering piston in a metering channel, the metering piston being configured to dispense the lubricant in a metered manner to the consumption points by moving along the metering channel,
wherein the sensor element is configured to detect a position of the metering piston such that the operating parameter is the position of the metering piston,
wherein the programmable control unit is configured to count a number of strokes of the metering piston from the signals sent by the sensor element and to switch off the at least one pump when a defined stroke number is reached.

9. A lubricant distribution system comprising:
a lubricant pump,
a metering device for distributing metered amounts of lubricant to consumption points, the metering device including a distributor block and a metering piston configured to move linearly within the distributor block,
a programmable control unit, and
a sensor configured to detect when the metering piston is at a particular position and send a signal to the programmable control unit in response to the metering piston being at the position,
wherein the programmable control unit is configured to store a first duration as a cycle time and to store a second duration as a monitoring time and to store a cycle number, and
wherein the programmable control unit is configured to measure a first time and to independently measure a second time and to count a number of signals received from the sensor and to control the lubricant pump based on the number of signals.

10. The lubricant distribution system according to claim 9, wherein the programmable control unit is configured to switch off the lubricant pump if the number of signals reaches the cycle number before the first time reaches the first duration.

11. The lubricant distribution system according to claim 10, wherein the programmable control unit is configured to switch off the lubricant pump and generate a fault signal if the first time reaches the first duration before the cycle number reaches the cycle number.

* * * * *